(No Model.)
B. S. BENSON.
TRACTION WHEEL.
No. 252,348. Patented Jan. 17, 1882.
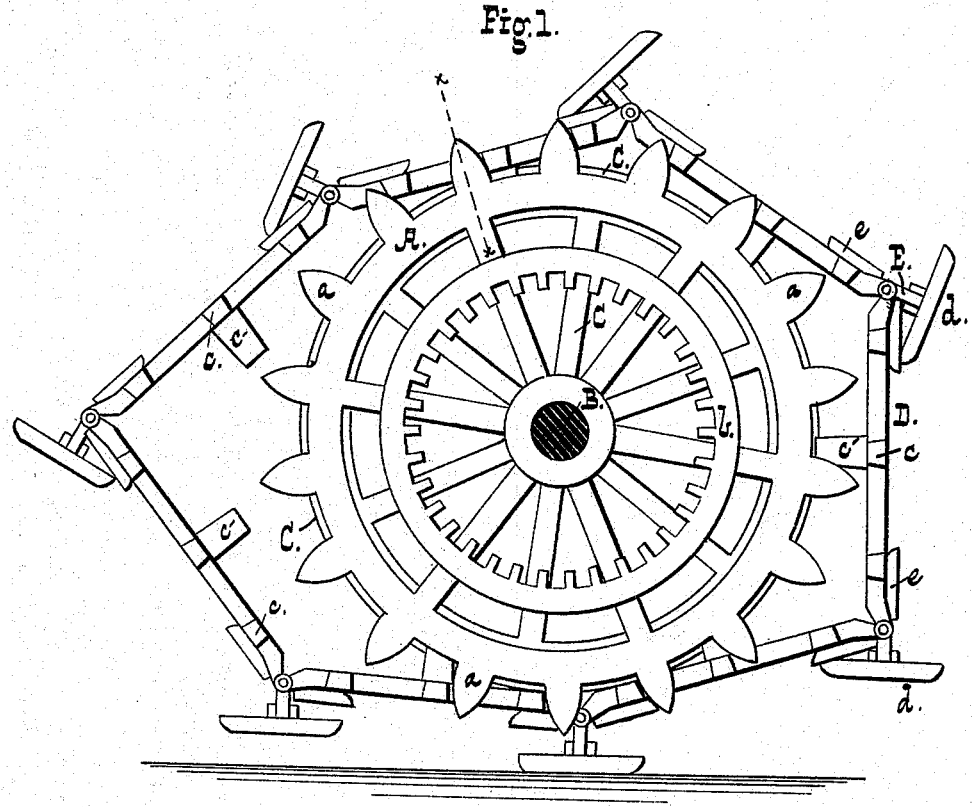
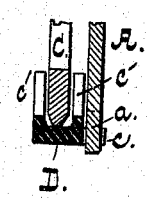
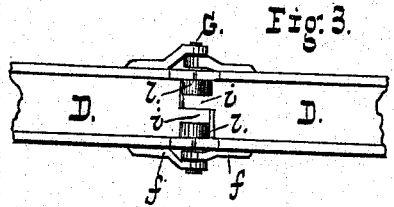
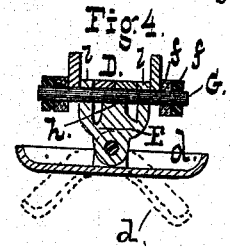
WITNESSES.
INVENTOR
B. S. Benson.
BY
ATTORNEY.

UNITED STATES PATENT OFFICE.

BENJAMIN S. BENSON, OF BALTIMORE, MARYLAND.

TRACTION-WHEEL.

SPECIFICATION forming part of Letters Patent No. 252,348, dated January 17, 1882.

Application filed July 7, 1881. (No model.)

*To all whom it may concern:*

Be it known that I, BENJAMIN S. BENSON, of Baltimore city, State of Maryland, have invented certain new and useful Improvements in Traction-Wheels; and I hereby declare the same to be fully, clearly, and exactly described as follows, reference being had to the accompanying drawings, in which—

Figure 1 is a side elevation of the wheel. Fig. 2 is a sectional view on the line $x$ $x$ of Fig. 1. Fig. 3 is a plan view of the joint connecting two of the track-links, and Fig. 4 is a cross-sectional view of one of the feet and its immediate attachments.

My invention relates to that class of wheels used in connection with an endless track which is laid in advance of the wheel and taken up behind it, and upon which the wheel runs; and it consists in a device of that class constructed as hereinafter described, and adapted as well for use upon a traction-vehicle as upon one which is drawn or propelled by other means.

In the drawings, A is a wheel, having a series of teeth, $a$ $a$, by preference curved in a cycloid, as shown. It is mounted upon a shaft, B, either loosely or rigidly, as may be desired. The same shaft carries a second plane-faced wheel, C, of substantially the same size as the wheel A, to which or to the shaft it may be secured.

A gear-wheel, $b$, is or may be rigidly connected with the wheel A, (it must be if the device is to be used upon a traction-vehicle,) and it meshes with a suitable pinion device by the engine, so that positive motion is communicated to the wheel A.

If the vehicle is to be drawn the wheel $b$ is omitted, or if the vehicle is to be drawn or used as a traction-vehicle, as occasion may require, the wheel $b$ is furnished with a clutch, whereby it may be thrown into or out of gear.

The track consists of links D, pivoted together and having an aggregate length exceeding that of the periphery of the wheel C in about the ratio of seventeen to twelve. On one edge of the links D is a series of cogs, $c$ $c$, with which the teeth $a$ mesh, and near the center of each link is a pair of guides, $c'$, between which the wheel C runs upon the inside face of the link.

At the end of each link is a pair of lugs, $f$, perforated for the passage of the pivot-pin G and extending beyond the exterior face of the link, so that the pin passes outside the same and under the overlapping ends $i$ $i$ of the two connected links. These ends furnish a continuous tread for the wheel on the inner face of the links and protect the pins G from wear.

The feet $d$ are saucer-shaped disks, to the center of each of which is pivoted the support E, so that the feet are susceptible of a rocking motion at right angles to the plane of the track, and accommodate themselves to inequalities of surface.

The supports E are bifurcated, forming bearings $l$ $l$, through which the pins G pass, and are provided with an intermediate boss, $h$, partly inclosing the pin and serving to sustain it and the parts $i$ of the track under the weight imposed by the wheel. In case the device is to be used in connection with a gang-plow, the feet are bent about the longitudinal axis, as shown at $d'$, so as to rest upon the edge of the furrow.

To the outside of the track-links are secured semicircular dished disks $e$, against which the feet $d$ rest, and which serve to catch any earth which would otherwise fall from the feet upon the joints and discharge it clear of the same. Instead of making the bearing E single and pivoting it between two ears on the foot $d$, it may be bifurcated and pivoted between three ears, and for rough work such construction is to be preferred as giving greater strength.

In operation, as the wheel A turns or is made to turn, its teeth, entering between the cogs $c$ at the top of the wheel, carry up the track-links and pass them forward, as shown, the teeth on the lower side of the wheel also meshing with the cogs and giving a firm gripe for the power of the engine. The wheel C, which sustains the weight, meanwhile runs freely upon the track, being guided by its side ledges and guides $c'$. The feet, being pivoted about axes at right angles after the manner of gimbals, adjust themselves perfectly to the inequalities of the soil, swinging against the disks $e$ as they are lifted, and swinging vertically to meet the ground as the links descend on the opposite side of the wheel. This action takes place indifferently whether the machine be run forward or backward, and as, except in the instant the wheel passes over the center of a link, the weight is supported for the whole or the greater part by a single foot, the machine may readily be turned in a curve as readily as, if not more so than, a common wheel. It is clear that the device will operate if the wheel A and the cogs be omitted, but not so well as when they are used, by reason of the increased friction caused by the slide of the wheel upon the track.

Instead of using two wheels, A and C, a single wheel may be used having cogs on its edge; or, as stated, the latter may be omitted, the track being adaptable to use with an ordinary wagon-wheel, and greatly lessening the draft if the soil be soft or muddy.

A brake or rubber is applied to the periphery of the wheel $b$, or to the sides of the track or elsewhere, for use as an ordinary brake in descending hills.

What I claim is—

1. In combination with the wheel, the track-links provided with lateral downwardly-projecting ears, the feet $d$, having ears $l$, and the pivot-pins passing through the ears of the track-links and feet and below the links, as set forth.

2. In combination with the wheel, the track-links having overlapping ends $i$, and the feet having ears $l$, of a thickness above the pins equal to that of the parts $i$, whereby an even tread for the wheel is afforded, as set forth.

3. In combination with the track-links and feet, the pivot-pins connecting the same and the central supports, $h$, sustaining the pins, as set forth.

4. In combination with the wheel, the track-links having side guides, $c'$, therefor, and the feet pivoted to the links, as set forth.

5. In combination with the track-links having cogged edge and the feet pivoted thereto, as set forth, the wheels A and C.

6. In combination with the track-links and feet pivoted together, as set forth, the wheels A and C and the gear-wheel $b$.

BENJAMIN S. BENSON.

Attest:
R. D. WILLIAMS,
W. A. BERTRAM.